United States Patent [19]

Szöke et al.

[11] 4,035,638

[45] July 12, 1977

[54] ISOTOPE SEPARATION

[76] Inventors: Abraham Szöke, 22 Harakafot Street, Kfar Shmaryahu; Isaiah Nebenzahl, 10 Nachshon Street, Haifa, both of Israel

[21] Appl. No.: 563,139

[22] Filed: Mar. 28, 1975

[30] Foreign Application Priority Data

Mar. 29, 1974  Israel ................................ 44529

[51] Int. Cl.² .................. G01N 27/28; H01J 39/34
[52] U.S. Cl. ............................ 250/251; 250/284; 250/423 P
[58] Field of Search ............... 250/423 P, 284, 283, 250/282, 281, 251

[56] References Cited

U.S. PATENT DOCUMENTS

| | | | |
|---|---|---|---|
| 3,558,877 | 1/1971 | Pressman | 250/284 |
| 3,772,519 | 11/1973 | Levy | 250/423 P |

*Primary Examiner*—Alfred E. Smith
*Assistant Examiner*—T. N. Grigsby
*Attorney, Agent, or Firm*—Hubbell, Cohen, Stiefel & Gross

[57] ABSTRACT

A process for the separation of one isotope from a mixture of isotopes and an apparatus for carrying out said process. The process comprises generating a beam of the atoms or molecules, introducing the beam into a laser cavity in such manner that the direction of the laser beam is substantially perpendicular to the direction of motion of the beam, irradiating the beam with a radiation adapted to being about the excitation only of the isotopic species to be separated, reflecting the laser beam back and forth between at least a pair of opposed sides of the laser cavity, such as between two mirrors opposite and parallel to each other which are located on these sides, for deflecting the desired isotopic species, and collecting said species.

17 Claims, 3 Drawing Figures

ISOTOPE SEPARATION

BACKGROUND OF THE INVENTION

1. Field of the Invention

The present invention relates to the separation of isotopes by irradiation.

2. Description of the Prior Art

The application of irradiation by means of lasers to atomic separation has been described in the article of Ashkin in Physical Review Letters, 25, (19) of Nov. 9, 1970, pages 1321–1324. According to Ashkin it is proposed to use the saturated value of the radiation pressure force on neutral atoms to produce a central force field to deflect atoms in circular orbits and make a high velocity analyser. This is stated to be useful for studying the interaction of atoms with high-intensity monochromatic light and to separate, velocity analyze, or trap neutral atoms of specific isotopic species or hyperfine level. In addition, C. Bradley Moore in a publication, Accounts of Chemical Research, 6 (1973) 323–8, reviews the application of lasers to isotope separation.

The process of the present invention is similar in certain respects to the process of Ashkin, but differs therefrom in some critical aspects, resulting in a considerably higher separation factor and efficiency. According to the process of Ashkin the atoms are irradiated from one direction only, and they are accelerated in one direction only. An atomic beam emerging from an over into a vacuum is irradiated with saturating resonance radiation transverse to the initial velocity of the beam. When an atom absorbs a photon, of energy $h\nu$ the momentum of the atom increases by a vector of magnitude $h\nu/c$ and direction parallel to the motion of the photon prior to the absorption. The excited atoms emits spontaneously a photon, on the average in a random direction, and thus gains on the average zero additional momentum. The emission of the photons takes place after a certain time lag, the average of which is the lifetime of the excited atom. The direction of the emitted photons in space is random. On the average each atom gains a momentum of $h\nu/c$ along the direction of the laser beam per each absorbtion and emission of a photon. This process is repeated as long as the atom moves within the laser beam, and per each absorption and emission a slight deflection of the beam is attained. When the beam is directed on a mixture of two or more isotopes of a certain element, one of these can be selectively deflected by using laser light in resonance with the one isotopic species but not with the others, and only these atoms will be deflected. Tunable dye lasers make possible the exact adjustment of the wave-length required for the intended purpose. The Ashkin method has a number of drawbacks: The power requirement is rather high. For example, to deflect by one degree of arc an atomic beam having a flux of 1 ton per year, of atoms moving at a thermal speed of 3.104 cm/secl, an average laser power of 50 KW throughout the year is required. Since the atomic beam is narrow in the direction of propagation of the laser beam, it has a small optical density, and thus a significant part of the photons traverse the atomic beam without being absorbed. This results in a further loss of power and increases substantially the costs of the separation. Furthermore, the laser power per unit area must be kept low enough to avoid the phenomenon of induced emission, since induced emission along the laser beam results in a loss of the momentum of the atoms gained by the absorbtion of the photon from the laser light. The method of Ashkin is not applicable to atoms having intermediate metastable (very long lived) states. If atoms pass into such metastable state, they are unable to absorb further laser light since the laser is tuned only to the transition from the ground state to the desired excited state. In the context of the present discussion, a metastable state is one of the order of magnitude of the passage time of the atom across the laser beam. This is typically of the order of $10^{-4}$ seconds. Uranium atoms have quite a number of metastable states and thus it is not certain that the method proposed by Ashkin will be applicable to uranium ions. Furthermore, the method proposed by Ashkin provides only random direction of the momentum due to emission of the photons.

SUMMARY OF THE INVENTION

The present invention relates to a novel process for the separation of isotopes by means of irradiation with intense light. The novel process is characterised by a comparatively high degree of efficiency, and thus the power requirements of this process are lower than that of similar processes described hitherto. The lower power requirement results in a lower price per unit of separated isotope, and this is of substantial economic importance. Other and further features of the present invention will become apparant hereinafter.

The invention relates to a process for the separation of one isotope from a mixture of isotopes, which comprises generating a beam of the atoms or molecules, introducing the beam into a laser cavity in such manner that the direction of the laser beam is substantially perpendicular to the direction of motion of the said beam, irradiating the beam with a radiation adapted to bring about the excitation of only the isotopic species to be separated, reflecting the laser beam back and forth between at least a pair of opposed sides of the laser cavity, such as between two mirrors opposite and parallel to each other which are located on these sides, for deflecting the desired isotopic species, and collecting said species.

The invention further relates to a device for the separation of an isotopic species out of a mixture of isotopic species, comprising in combination a means for generating one or more narrow atomic or molecular beams, means for irradiating these beams by means of a controlled radiation of desired wave-length, means for reflecting said radiation back and forth in a direction substantially perpendicualr to the direction motion of said beams and means for collecting the separated desired isotopic species.

DETAILED DESCRIPTION OF THE PREFERRED EMBODIMENTS

Figure 1:
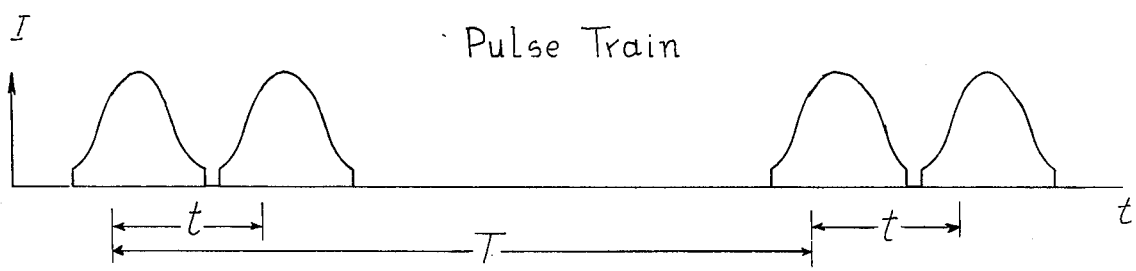
FIG. 1 is a graphical illustration of a typical pulse train utilized in accomplishing the preferred process of the present invention.

According to the present invention there is provided a novel method for the separation of isotopes. The method of the present invention is applicable to atomic mixtures of isotopes, and it may be applied in certain cases also to the separation of molecular species. In the following the invention is described with reference to the separation of an atomic species of isotopes, such as for example the separation of metallic uranium. It ought to be understood that this is by way of illustration only and that the method is applicable also to certain molecular species.

According to the present invention there is first produced a narrow atomic beam (of about 0.1 mm width), and this is done by any conventional method, such as for example the method of Ashkin. This beam is passed through a laser cavity, the direction of the beam being perpendicular to that of the laser beam propagation. There is advantageously preferably used a laser operated in a pulsed mode and at a frequency which changes with time in a predetermined manner, this type of operation being designated as "chirping". The duration of the pulse and the manner of chirping are effected in a manner to satisfy certain conditions which will be explained hereinafter. The frequency of the laser is preferably adjusted in a manner, such as by a Fabri Perot etalon, so that during the period of the pulse it passes through one, and only one, of the absorption (resonance) frequencies of the atomic species to be deflected. If the predetermined conditions are fulfilled there is attained an "adiabatic rapid passage" and substantially every atom of the desired species absorbs one photon if at the beginning of the pulse it was in its ground state, and it emits one photon into the beam if prior to the pulse it was in the desired excited state. The deflection of the beam is attained by sending such chirped pulses of light alternatingly in opposite directions. The momentum $p$ gained by each atom after the passage of one pulse in both directions is $p = 2h\nu/c$, where $h\nu$ is the energy of one photon, such as 0.1 to 4.0 eV, and $c$ is the speed of light and for the passage of 2N pulses wherein $N =$ the number of pulses passed in both directions, the gain of momentum is $p=2Nh\nu/c$. Thus the species to be separated is gradually deflected in the desired direction.

In principle the irradiation from the one direction brings about an elevation of the atoms of the desired atomic species from its ground state to the desired excited state, the momentum being gained by this being $h\nu/c$ in the direction of the irradiation. The subsequent irradiation of the same atomic species (now in the excited state) from the opposite direction results in said species emitting a photon in the direction of the irradiation, causing a "recoil" of the atom in the opposite direction, adding a further vector $h\nu/c$ in the same direction as that of the momentum due to the excitation.

It is one of the pronounced advantages of the preferred process of the present invention that the dimensions of the device utilized in carrying out the preferred process of the present invention (FIG. 3) can be easily chosen in such manner that the distance between opposite mirrors which preferably enables irradiation of the atomic beam from two opposite directions as will be described in greater detail hereinafter is such that the same pulse train travels back and forth, such as a distance of twice 210 cm for 14 nanoseconds. The photons are absorbed and emitted practically instantaneously.

Figure 2:
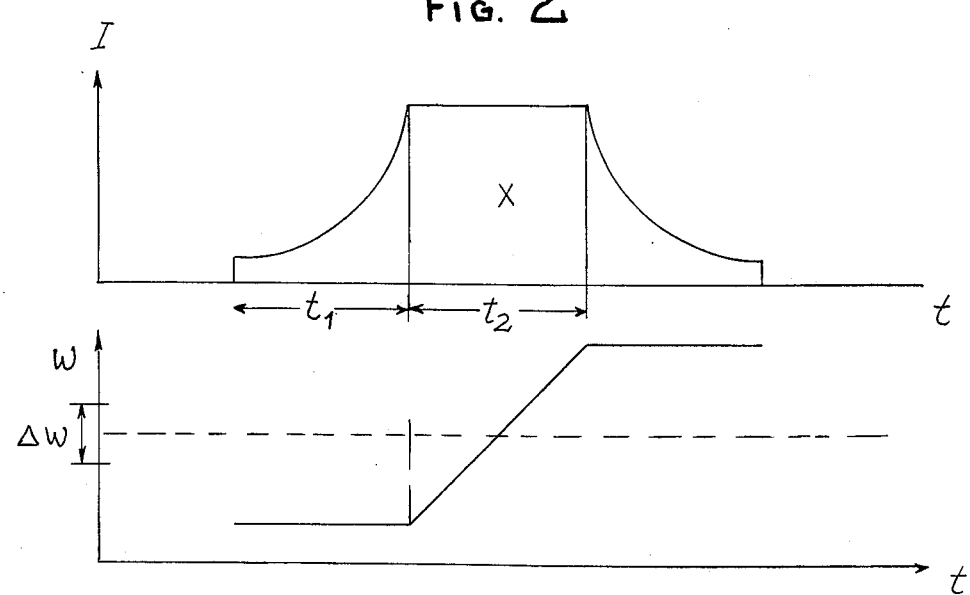
FIG. 2 is a graphical illustration of a typical preferred pulse waveform for comprising the pulse train of FIG. 1.

According to a preferred embodiment of the present invention pulse trains consisting of pairs of pulses of duration and of a predetermined interpair separation $t$, such as 3 nanoseconds, are used (FIG. 1), the pairs of pulses being repeated at time intervals of T, such as 14 nanoseconds. An advantageous pulse form for the pulses illustrated in FIG. 1 is shown in FIG. 2, this pulse being characterised by a maximum initial jump $I_0$, a maximum permissible, exponential rise-time $t_1$, to a value $I_1$, a mimimum duration $t_2$, and intensity in the center portion $x$ and a maximum frequency sweep rate $f_{max}$ associated with it. For example, these values may typically preferably be $I_0 = 0.1$ W $I_1=3$ Watt, $t_1=1$ n. sec, $t_2 = 1$ n. sec and $f_{max} = 10^{-5}$ cm$^{-1}$/nanosecond.

It is stressed that the experimental arrangement is one of choice, and that many variations in the details of the arrangement can be resorted to without departing from the scope and spirit of the present invention. The main features of the invention are the illumination of the atomic or molecular beam from two opposite directions, so as to bring about the selective excitation of the desired isotopic species, and the emission of the thus collected photon after irradiation from the opposite direction, this being effected repeatedly until the desired deflection of the atomic species is attained. A further preferred embodiment of the present invention is the use of a pulse, which is conventionally chirped about the excitation frequency and in a predetermined range sufficient to bring about the excitation of the desired species only, such as a resonance transition of U235 F$_6$.

Due to this arrangement, a much better factor of separation can be attained, this being about 30 times better than that which can be attained by the Ashkin method.

The atomic or molecular beams are necessarily narrow (of the order of about 0.1 mm at the lower slit or nozzle), and these are not to have an opening greater than about 1/30 radian without the application of the irradiation. Thus, above the upper edge of their radiated space there is obtained the desired degree of separation and the separated species is deflected to a sufficient degree as to be collected apart from the other species.

The following example illustrates the applicability of the process of the present invention to the separation of U-235 from U-238.

This separation can be effected by means of a laser of average power of 240 mw, two mirrors parallel with each other being located a distance of 210 cm. from each other, the beam of irradiation being of 2 cm times 2 cm. A frequency of 5028.295 A is suitable for exciting the desired U-235 isotope. The atomic beam is conventionally generated by heating by means of an electron beam or by any other suitable method, the beam being conventionally collimated by suitable baffles, the irradiation being substantially perpendicular to the direction of the atomic beam. there is used advantageously a plurality of atomic beams, such as 10, all of these being within a length of about 30 cm. length out of the total length of 210 cm. of the distance between the mirrors, said 30 cm length being about the middle of the 210 cm. stretch. The interior of the device is maintained at a background pressure of about 10$^{-5}$ torr background pressure of an inert gas, such as argon, a flow of the gas preferably being maintained about the mirrors so as to prevent a deposition of atoms thereon. The vapor of the uranium is maintained at about 3.10$^{13}$ atoms/cm$^3$ A satisfactory pulse length is about 3 nanoseconds, the frequency being about 1 pulse per 14 nano-seconds. An exactly tuned laser, such as a dye laser, makes it possible to attain a satisfactory separation.

Figure 3:
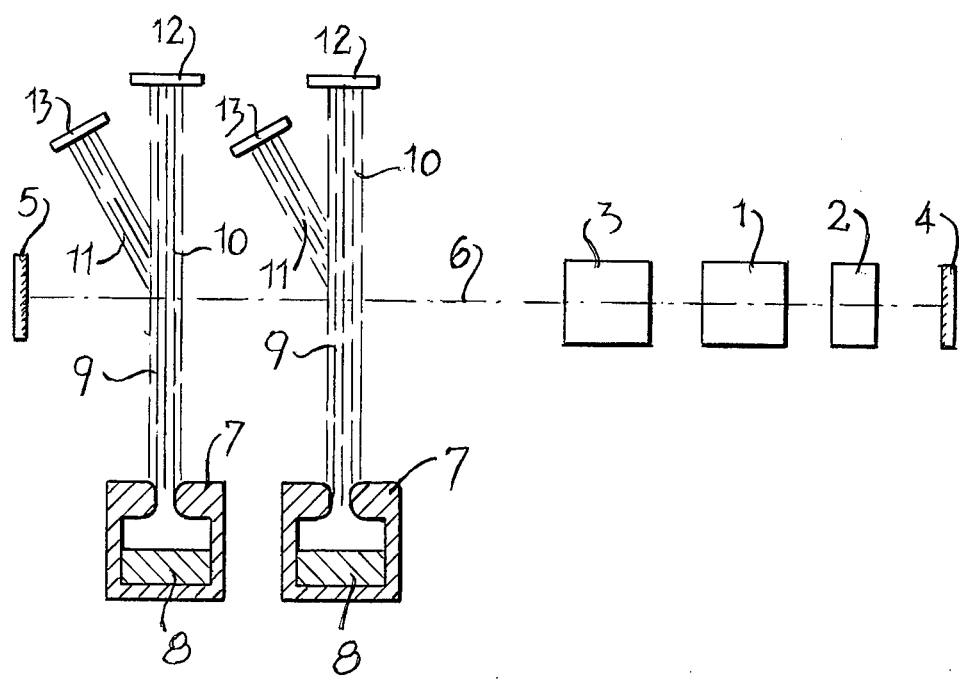
FIG. 3 is a block diagram of the preferred apparatus for carrying out the preferred process of the present invention.

Much better results are attained when a chirped laser pulse is used. A suitable pulse is one of about 5028.295 A + 0.01 A, the pulse length being about 3 nano-seconds, the frequency about 1 pulse per 14 nano-seconds. Each of the atomic beams is very narrow, (about 0.1 mm) and is advantageously collimated to about not more than 1/30 radian and to a width of about 2 cm., corresponding to that of the laser beam. By this arrangement it is possible to obtain a throughput of about $3.10^{18}$ atoms/sec which corresponds to about 24 mg/hour at an average laser power of 240 mw. The separated isotope is collected on comparatively cold surfaces positioned at the right location such as shown in FIG. 3. The separated atomic species is collected advantageously at least 2 com after the upper edge of the irradiated portion, the deflection being about 2o with respect to the undeflected species. A purity of about 80 percent can thus be attained, and correspondingly larger yields of smaller enrichment.

The following example illustrates the application to the separation of HDO from water. The laser arrangement is similar, the wave length being about $2.7\mu$, exciting HDO in one or more of its vibrational rotational transitions. The molecular beam is obtained by evaporation and controlled stream through nozzles. Similar pressures of the background are used, the beam is passed through suitable nozzles. Similar pressures of the background are used, the beam is passed through suitable nozzles and the beams are irradiated. A plurality of lasers can be used for obtaining an excitation to several levels and better yields. For a throughput of about $2.10^{20}$ molecules per second a yield of about 8 mg/hour of HDO at an average power of about 0.25W can be obtained, purity about 60 percent.

The above examples are by way of illustration only and it is clear that the method is applicable to any other suitable atomic or molecular species.

As shown and preferred in FIG. 3, the preferred device for carrying out the previously described preferred process of the present invention preferably comprises (shown schematically and not according to scale in block diagram form and in a drawing, in section) a pulsed laser 1, a tuning device 2, a chirping device 3, two mirrors 4 and 5, facing each other, all these being arranged on the optical axis 6 of the device; two evaporation ovens 7, each having a nozzle-shaped opening at its upper part, each containing material to be evaporated 8 (such as uranium metal), said material leaving said nozzles in the form of an atomic beam 9 (unseparated isotope mixture), a collector 12 for the undeflected atomic beams 10, and collectors 13 for collecting the deflected isotope of the beams 11.

What is claimed is:

1. A process for the separation of one isotopic species from a mixture of isotopes, which comprises the steps of generating a beam of the atoms or molecules, introducing said beam into a laser cavity for providing a direction of the laser beam substantially perpendicular to the direction of motion of said atom beam, irradiating said atom beam with a sufficient radiation for bringing about the excitation of only the isotopic species to be separated, said radiation being by means of pulses of radiation, said laser being operated in a pulsed mode, reflecting said pulsed laser beam back and forth between at least a pair of opposed sides of said laser cavity for deflecting said isotopic species, and collecting said species.

2. A process as claimed in claim 1, wherein the beam is one of uranium atoms.

3. A process as claimed in claim 1, wherein the laser beam is passed through a plurality of narrow atomic or molecular beams.

4. A process as claimed in claim 1, wherein the beam of the material to be separated is passed through one or more supersonic nozzles into the laser cavity.

5. A process as claimed in claim 1, wherein the laser is operated in a chirped mode.

6. A process as claimed in claim 5, wherein the chirping is about a predetermined frequency having a minimum and maximum value for exciting only said isotopic species.

7. A process as claimed in claim 5, wherein the chirped pulse has an exponential rise time, a substantially constant level and an exponential decrease.

8. A process as claimed in claim 1 wherein said reflecting step comprises providing a pair of opposed and parallel mirrors on said pair of opposed sides of said laser cavity for reflecting said laser beam back and forth therebetween.

9. A process as claimed in claim 8 wherein said mirrors are at a distance from each other substantially larger than the length of a pulse of said laser beam.

10. A process as claimed in claim 8, wherein the pulse length is less than about one third of the distance between the opposed mirrors.

11. A process in accordance with claim 1 wherein said reflecting step comprises the step of making said radiation pulses travel back and forth in said laser cavity for transferring a plurality of quanta of momentum to said atoms or molecules of said isotopic species by exciting the absorbing atoms or molecules when the pulses traverse the cavity in one direction and deexciting said absorbing atoms or molecules when the pulses traverse the cavity in the opposite direction, said plurality of quanta of momentum transferred atoms or molecules of said isotopic species being deflected out of said beam.

12. A process in accordance with claim 11 wherein said reflecting step further comprises providing a pair of opposed mirrors on said pair of opposed sides of said laser cavity for reflecting said laser beam back and forth therebetween, said mirrors being at a distance from each other substantially larger than the length of a pulse of said laser beam.

13. A process in accordance with claim 11 wherein said laser is operated in a chirped mode.

14. A device for the separation of an isotopic species out of a mixture of isotopic species, comprising in combination a means for generating at least one narrow atomic or molecular beam, means for irradiating these beams by means of a controlled pulsed radiation of desired wave-length, means for reflecting said pulsed radiation back and forth in a direction substantially perpendicular to the direction motion of said beams and means for collecting the separated desired isotopic species.

15. A device as claimed in claim 14 for the separation of desired isotopic species, wherein said generating means comprises means for introducing said beam into a laser cavity, said irradiating means comprises a pulsed laser beam, and said reflecting means comprises a pair of opposed and parallel mirrors located on a pair of opposed sides of said laser cavity for reflecting said pulsed laser beam back and forth, the distance between said opposed mirrors being at least three times the length of a pulse of said laser beam.

16. A device as claimed in claim 14, wherein said irradiating means comprises a laser beam and means for chirping a pulse of said laser beam within a predetermined range of frequencies.

17. A device as claimed in claim 16, wherein at least one supersonic nozzle is provided for the generating of a suitable beam of the material to be separated.

* * * * *